US009185216B2

(12) United States Patent
Purnadi et al.

(10) Patent No.: US 9,185,216 B2
(45) Date of Patent: Nov. 10, 2015

(54) SYSTEM AND METHOD FOR INDICATING EMERGENCY CALL BACK TO USER EQUIPMENT (75) Inventors: Rene W. Purnadi, Coppell, TX (US); M. Khaledul Islam, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 1345 days.

(21) Appl. No.: 11/940,663

(22) Filed: Nov. 15, 2007

(65) Prior Publication Data

US 2008/0310599 A1  Dec. 18, 2008

Related U.S. Application Data (60) Provisional application No. 60/944,258, filed on Jun. 15, 2007.

(51) Int. Cl.
*H04M 11/04* (2006.01)
*H04M 3/51* (2006.01)
*H04Q 3/64* (2006.01)
*H04M 1/725* (2006.01)
*H04L 29/06* (2006.01)

(52) U.S. Cl.
CPC ............. *H04M 3/5116* (2013.01); *H04Q 3/64* (2013.01); *H04L 65/1016* (2013.01); *H04M 1/72538* (2013.01); *H04Q 2213/1337* (2013.01); *H04Q 2213/13152* (2013.01); *H04Q 2213/13176* (2013.01); *H04Q 2213/13204* (2013.01); *H04Q 2213/13248* (2013.01); *H04Q 2213/13348* (2013.01); *H04Q 2213/13389* (2013.01)

(58) Field of Classification Search
USPC ......... 379/37–51, 88.2, 127.01, 27.01, 88.13, 379/114.29, 265.09
See application file for complete search history.

(56) References Cited

U.S. PATENT DOCUMENTS

| 7,050,785 | B2 | 5/2006 | Islam et al. | |
|---|---|---|---|---|
| 7,139,549 | B2 | 11/2006 | Islam et al. | |
| 2004/0176066 | A1 | 9/2004 | Binzel et al. | |
| 2006/0072547 | A1 | 4/2006 | Florkey et al. | |
| 2007/0054653 | A1* | 3/2007 | Isalam et al. | 455/404.1 |
| 2007/0060097 | A1* | 3/2007 | Edge et al. | 455/404.1 |
| 2007/0066277 | A1 | 3/2007 | Bharatia et al. | |
| 2007/0117539 | A1 | 5/2007 | Harris | |
| 2007/0117577 | A1 | 5/2007 | Harris | |
| 2007/0149166 | A1* | 6/2007 | Turcotte et al. | 455/404.1 |

(Continued)

FOREIGN PATENT DOCUMENTS

EP  1124394 A1  8/2001
WO  2007016695 A2  2/2007

OTHER PUBLICATIONS

Korean Office Action; Application No. 10-2010-7000771; Aug. 5, 2011; 8 pages.

(Continued)

*Primary Examiner* — Yosef K Laekemariam
(74) *Attorney, Agent, or Firm* — Conley Rose, P.C.; J. Robert Brown, Jr.

(57) ABSTRACT

A method is provided for indicating an IMS (Internet Protocol Multimedia Subsystem) emergency call back to a user equipment and an access network. The method comprises including in a message from a PSAP (Public Safety Answering Point) to the user equipment and the access network an indication that the emergency call back is from the PSAP.

7 Claims, 5 Drawing Sheets (56) References Cited

U.S. PATENT DOCUMENTS

2007/0211867 A1* 9/2007 Polk et al. .................. 379/45
2007/0268992 A1   11/2007 Goldman et al.
2008/0123821 A1*  5/2008 Goldman et al. ............ 379/45
2009/0147929 A1*  6/2009 Zhao ............................ 379/46

OTHER PUBLICATIONS

3GPP2, 3G, 3rd Generation Partnership Project 2 "3GPP2", "All-IP Network Emergency Call Support," Nov. 2007, 68 pages, 3GPP2X.P0049-0, Version 1.0- V&V.

3GPP Organizational Partners (ARIB, ATIS, CCSA, ETSI, TTA, TTC), "3rd Generation Partnership Project; Technical Specification Group Services and System Aspects; IP Multimedia Subsystem (IMS) emergency sessions (Release 7)," Dec. 2007, 32 pages, 3GPP TS 23.167, V7.7.0, Technical Specification.

Rosenberg, J.; Title: Applying Loose Routing to Session Initiation Protocol (SIP) User Agents (UA); draft-rosenberg-sip-ua-loose-route-01; Jun. 12, 2007; 20 pgs.

European Extended Search Report; European Application No. 07855458.1; Jan. 31, 2011; 7 pgs.

PCT International Search Report; PCT Application No. PCT/CA2007/002176; Applicant: Research in Motion Limited; Apr. 2, 2008; 3 pgs.

PCT Written Opinion of the International Searching Authority; PCT Application No. PCT/CA2007/002176; Applicant: Research in Motion Limited; Apr. 2, 2008; 4 pgs.

First Office Action from the Mexican Institute of Industrial Property (IMPI); MX Application No. MX/a/2009/013633; Mar. 16, 2011; 3 pages.

Mexican Office Action; Application No. MX/a/2009/013633; Nov. 29, 2011; 6 pages.

Chinese Office Action; Application No. 200780100171; Dec. 19, 2011; 10 pages.

Korean Office Action; Application No. 10-2010-700771; Feb. 20, 2012; 7 pages.

Canadian Office Action; Application No. 2,690,236; May 23, 2012; 4 pages.

Chinese Office Action; Application No. 200780100171.X; Sep. 29, 2012; 10 pages.

Canadian Office Action; Application No. 2,690,236; Mar. 21, 2013; 4 pages.

Chinese Office Action; Application No. 200780100171.X; Apr. 17, 2013; 11 pages.

Chinese Office Action; Application No. 200780100171.X; Dec. 11, 2013; 9 pages.

Mexican Office Action; Application No. MX/a/2009/013633; Nov. 30, 2011; 4 pages.

Canadian Office Action; Application No. 2,690,236; Apr. 10, 2014; 5 pages.

\* cited by examiner

SYSTEM AND METHOD FOR INDICATING EMERGENCY CALL BACK TO USER EQUIPMENT

CROSS-REFERENCE TO RELATED APPLICATIONS

The present application claims priority to U.S. Provisional Patent Application No. 60/944,258, filed Jun. 15, 2007 by Purnadi et al., entitled "System and Method for Indicating IMS Emergency Call Back to User Equipment" which is incorporated by reference herein as if reproduced in its entirety.

BACKGROUND

The IP (Internet Protocol) Multimedia Subsystem (IMS) is a standardized architecture for providing both mobile and fixed multimedia services that many telephony service providers are beginning to implement. The IMS architecture can include a collection of different functions (i.e., network elements) that communicate using standard protocols.

A user of an IMS network using a mobile device or any user equipment (UE) may place an emergency call, such as a 911 call (in North America) or a 112 call (in most of Europe). Such calls are typically handled by a Public Safety Answering Point (PSAP), which might coordinate an appropriate response to the emergency. After an emergency call is terminated, the PSAP may place a call back to the user for various reasons. For example, if the emergency call appears to have terminated abnormally, the PSAP might call the user back to determine if the user wishes to convey any additional information. Alternatively, the PSAP might call the user back to ask for information that was inadvertently not requested in the initial call. Other reasons for a call back from a PSAP to an emergency caller after the termination of an emergency call may be familiar to one of skill in the art.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method is provided for indicating an IMS (Internet Protocol Multimedia Subsystem) emergency call back to a user equipment and an access network. The method comprises including in a message from a PSAP (Public Safety Answering Point) to the user equipment and the access network an indication that the emergency call back is from the PSAP.

In another embodiment, a user equipment is provided that includes a processor configured to recognize an IMS (Internet Protocol Multimedia Subsystem) call as an emergency call back from a PSAP.

In another embodiment, a system is provided that includes one or more processors and instructions. The instructions when executed by the one or more processors promote providing an emergency call back indicator in a message from a PSAP to user equipment (UE).

When a PSAP attempts an IMS call back to a UE after an IMS emergency call from the UE to the PSAP is terminated, undesirable results may occur if the UE does not recognize that the call back is from the PSAP. For example, the UE may treat the call back as a regular call and place it on hold or call waiting, the call back could be blocked, or the UE might otherwise fail to respond appropriately to the call back. The present disclosure provides for indicating an IMS emergency call back from a PSAP to a UE by including in the call back an indication to the UE that the call back is from the PSAP. This allows the UE to distinguish between emergency call backs and regular calls. The indication or indicator that identifies the call to the UE as a call back from a PSAP may be associated with the call in various manners, some of which will be discussed in greater detail below. Others will readily suggest themselves to one skilled in the art in light of the present disclosure. Other techniques are provided in U.S. Pat. Nos. 7,050,785 and 7,139,549, both by Islam et al, which are incorporated herein by reference for all purposes.

Figure 1:
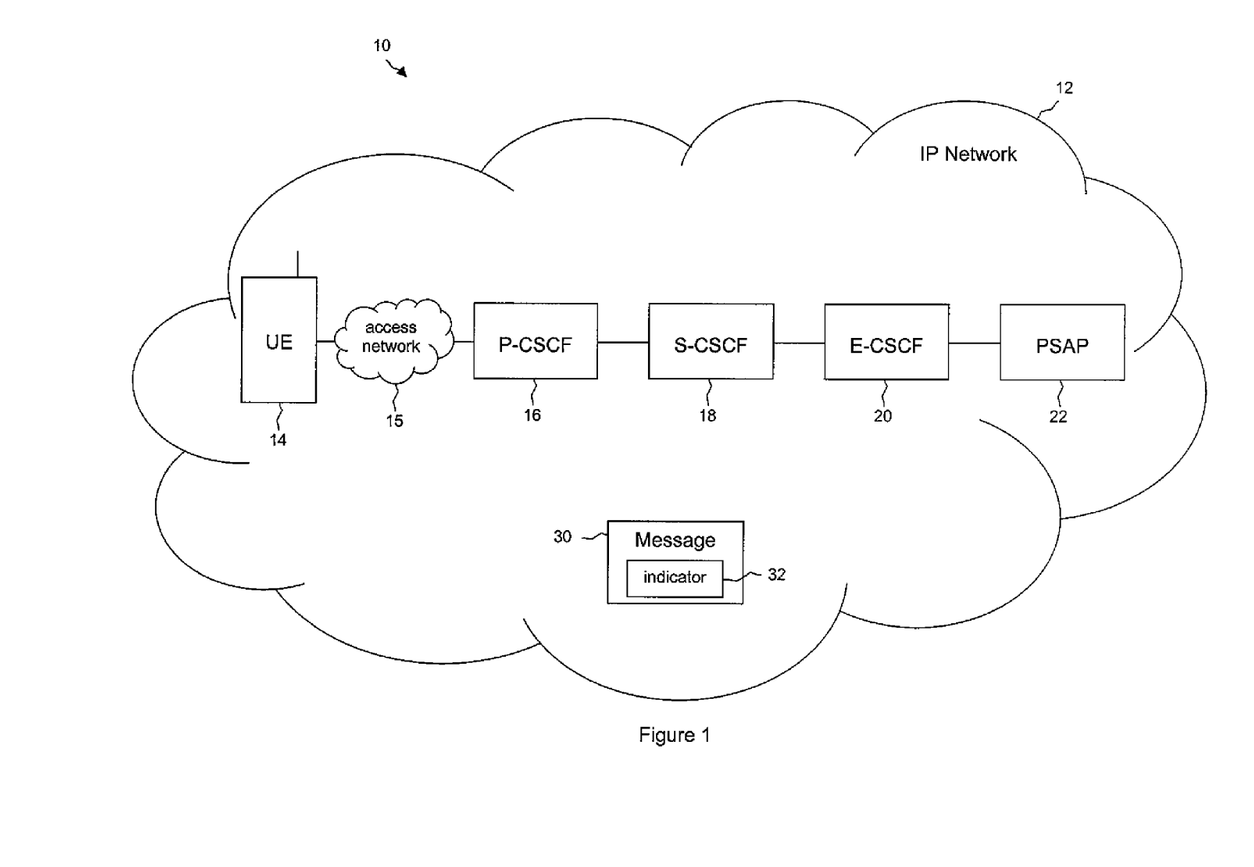
FIG. 1 is a diagram of an illustrative IP network including a user equipment and a Public Safety Answering Point according to an embodiment of the disclosure.

FIG. 1 illustrates a system 10 including an IP (Internet Protocol) network 12, which may also include one or more components of an IMS network. A UE 14 is shown and may include any end user device or system (e.g., mobile phone, mobile wireless device (including digital, cellular, or dual mode devices) personal digital assistant, laptop/tablet/notebook computer, desktop computer, etc.) that connects to an IMS network. A CSCF (Call Session Control Function) (not explicitly shown) is a well known element in an IMS network responsible, for example, for maintaining a SIP (Session Initiation Protocol) call and providing session control for subscribers accessing services within an IMS network.

The UE 14 communicates via an access network 15 with a P-CSCF (Proxy CSCF) 16. The access network 15 might be any well known set of components, such as base stations and other radio transmission and reception equipment, that can promote wireless connections to subsequent network components. The P-CSCF 16 is a SIP proxy that may be the first point of contact for the IMS terminal and may be located in the visited network in full IMS networks or in the home network if the visited network is not yet IMS-compliant. The P-CSCF 16 communicates with an S-CSCF (Serving CSCF) 18. The S-CSCF 18 is a SIP server that may be located in the home network and that may perform session control, downloading and uploading of user profiles, and other functions. The S-CSCF 18 communicates with an E-CSCF (Emergency CSCF) 20. The E-CSCF 20 provides session control functions for a PSAP (Public Safety Answering Point) 22, which may be a 911 system or another emergency call center or system.

To make an emergency or 911 call, the UE 14 might communicate with the PSAP 22 via the P-CSCF 16, S-CSCF 18, and E-CSCF 20. However, communication via the P-CSCF 16 might occur only when the UE 14 is roaming. When the UE 14 is in its home network, there may be no need for the P-CSCF 16, and the UE 14 might communicate directly with the S-CSCF 18. Hereinafter, any communication that is described as occurring via the P-CSCF 16 should be understood as possibly occurring without the presence of the P-CSCF 16.

Current 3GPP ($3^{rd}$ Generation Partnership Project) and 3GPP2 ($3^{rd}$ Generation Partnership Project 2) specifications (TS 23.167 in 3GPP and X.P0049 in 3GPP2) do not specify a method for the UE 14 to determine whether an incoming call is in fact a call back from an emergency system, such as the PSAP 22. According to one embodiment, the PSAP 22 provides an IMS emergency call back message 30, such as a SIP Invite, that includes an emergency call back indication or indicator 32. The UE 14 can use the indicator 32 to identify a call as an IMS emergency call back from the PSAP 22 and can then respond appropriately to the call back. For example, the UE 14 might use the indicator 32 to set a proper priority during bearer setup with the access network 15, might drop and block other calls if necessary, or might take other actions to promote or increase the likelihood of successfully completing the emergency call back. The indicator 32 may also allow the UE 14 to provide events, such as audible or video displayed alerts, that notify the UE user about the incoming emergency call back.

The UE 14 may also use the indicator 32 to trigger an action if the UE user has not responded to the call back after a certain time has elapsed. A failure to answer an emergency call back in a timely manner might be an indication that the user is incapacitated or is otherwise in need of emergency services. When no response to an emergency call back occurs within a predefined length of time after the indicator 32 is received, the UE 14 might initiate an automatic reply to the PSAP 22 that indicates that the user is unable to respond, might send the location coordinates of the UE 14, might send an automated message to another emergency system, or might trigger other actions. For example, the UE 14 might complete the call without physical input from the user, which might be useful when the user is unable to physically activate the UE 14 to receive the call. The P-CSCF 16 can provide the emergency call back indicator 32 to the access network 15 and the access network 15 can use the emergency call back indicator 32 to prepare and prioritize the appropriate resources for the emergency call back.

The emergency call back indicator 32 may be conveyed based on the current specifications in a variety of manners. However, the present disclosure is not so limited and is applicable in a variety of different systems and environments. In one embodiment, the indicator 32 may be provided by including the PSAP public identifier (PSAP PUID) in a SIP message sent from the PSAP 22 to the UE 14 after termination of an emergency call from the UE 14. More specifically, the PSAP PUID could be included in a SIP Invite message as the indicator 32. In this case, it may be useful for the PSAP PUID to have a standard naming convention or format, such as name@sos.domain, psap@domain, and so on, that identifies the PSAP 22 as an emergency-related entity. That is, words or arrangements of letters, numbers, or other characters, such as 'psap', 'sos', or 'emergency', might be used in the SIP Invite to indicate that the message 30 is from an emergency system, such as the PSAP 22.

The PSAP PUID may be provided in various locations in the SIP Invite message sent from the PSAP 22 to the UE 14. For example, the PSAP PUID could be placed in the 'From Header' that typically provides information on the identify of the sender of a SIP message. The standardized PSAP PUID format in the SIP Invite 'From Header' may make the SIP Invite readily recognizable by the UE 14 as a message associated with an emergency call back from PSAP 22. That is, the UE 14 might check the 'From Header' for a name or string, such as 'psap', 'sos', or 'emergency', that indicates that the SIP Invite is from the PSAP 22. If such a string is found, the UE 14 knows that the message is from the PSAP 22 and responds accordingly. The UE 14 might check every SIP Invite message for the name or string or might check only for some period of time after the UE 14 places a 911 or other emergency call.

In another embodiment, the UE emergency public identifier (ePUID) may be used as the indicator 32. As background, the UE 14 currently obtains an ePUID, which is different from the standard PUID, only when it performs an IMS emergency registration. However, under the current guidelines, the UE 14 performs an IMS emergency registration only when the UE 14 places an emergency call while outside its home network or only when the UE 14 does not have enough credentials to perform IMS regular registration. Therefore, the ePUID might not always be available for use as the indicator 32.

The present embodiment provides that the UE 14 performs an emergency IMS registration whenever the UE 14 places an emergency call, regardless of whether it is in its home network or roaming and regardless of whether it has enough credentials for regular registration. The UE 14 would then have an ePUID even when it makes an emergency call from within its home network and could provide the ePUID to the PSAP 22 whenever it makes an emergency call. When the PSAP 22 makes an emergency call back to the UE 14, the PSAP 22 could then use the ePUID as the indicator 32 in the message 30. More specifically, the ePUID could be placed in the SIP Invite 'To Header', which identifies the recipient of a SIP message. When the UE 14 receives a message that includes its own ePUID, such as a SIP Invite that has the UE ePUID in the 'To Header', the UE 14 could recognize the message as being associated with an emergency call back from the PSAP 22 and could respond appropriately.

In other embodiments, the emergency call back indicator 32 may be included in a SIP Invite from the PSAP 22 to the UE 14 in numerous other ways. For example, an explicit new emergency call back header might be added, or an implicit emergency call back indicator 32 might be placed inside an existing header, such as the P-Asserted-Identity header. Alternatively, other messages 30 may include or may be used as the indicator 32, or a myriad of other ways or techniques could be employed which will readily suggest themselves to one skilled in the art in view of the present disclosure.

Figure 2:
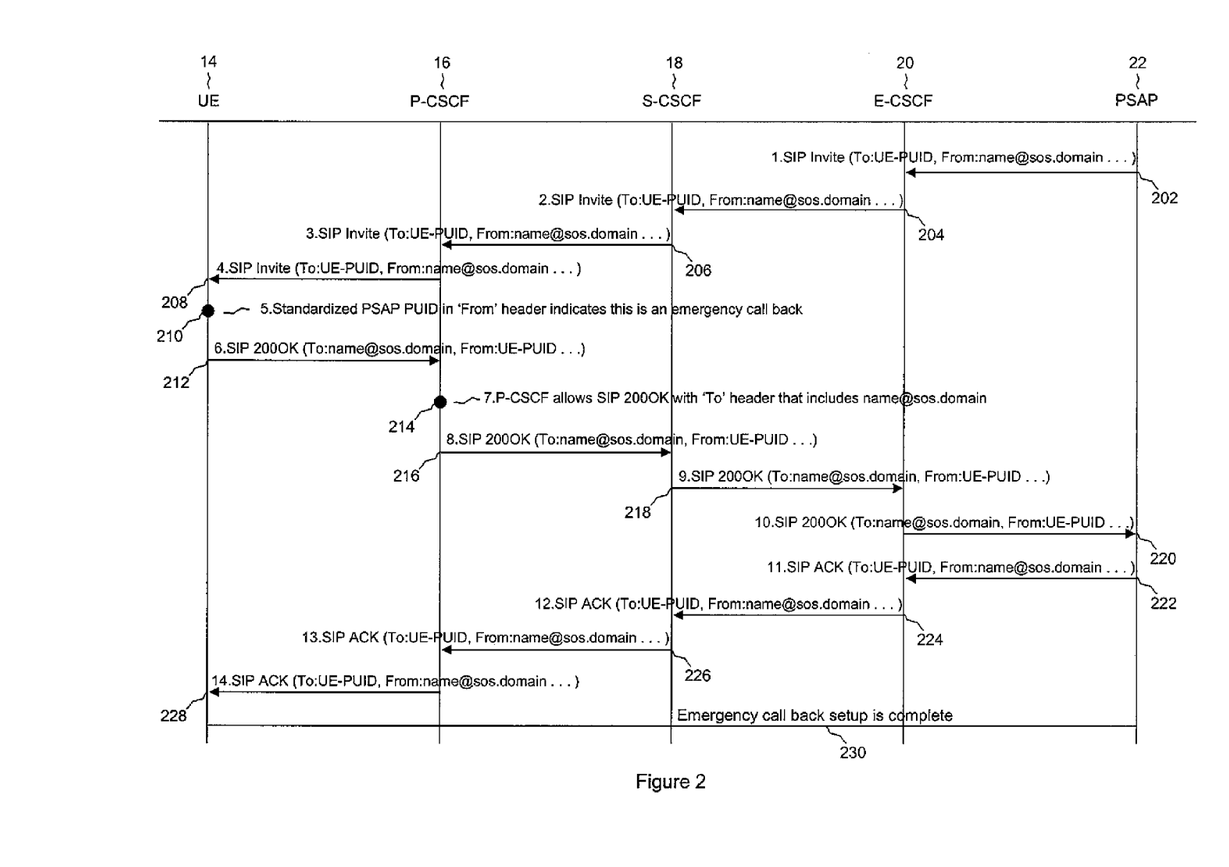
FIG. 2 is a sequence diagram illustrating a call flow according to an embodiment of the disclosure.

FIG. 2 illustrates an exemplary call flow diagram for a UE 14 that has previously initiated an IMS emergency call session using its standard PUID. In this embodiment, when the emergency call is terminated, the PSAP 22 attempts an emergency call back to the UE 14 using a SIP Invite message. The SIP Invite includes the UE PUID in the 'To Header' and includes a standardized or recognized PSAP PUID, such as name@sos.domain, in the 'From Header'. The standardized PSAP PUID format used in the 'From Header' is recognized by the P-CSCF 16 (or the S-CSCF 18 when the P-CSCF 16 is not present) and by the UE 14 as an indication of an emergency call back from the PSAP 22. The UE 14 and the access network 15 may then set the highest priority for the call to ensure a successful emergency call back and/or may perform other actions, as discussed above.

At event 202, responsive to abnormal emergency call termination, or for some other reason, the PSAP 22 initiates a call back to the UE 14. The PSAP 22 forms a SIP Invite message that includes the UE PUID in the 'To Header' and uses the standardized or recognized PSAP PUID format as the indicator in the 'From Header'. In this example, the PSAP PUID uses name@sos.domain as the standard format. The 'sos' in the SIP Invite originating from the PSAP 22 indicates to the UE 14 that this is an emergency call back. However, other parameters placed in other locations in the SIP Invite message or in other messages may also be used as the indicator. The SIP Invite formed in this manner is then sent to the E-CSCF 20.

At event 204, the E-CSCF 20 forwards the SIP Invite to the S-CSCF 18. At event 206, the S-CSCF 18 forwards the SIP Invite to the P-CSCF 16. At event 208, the P-CSCF 16 forwards the SIP Invite to the UE 14. The P-CSCF 16 may use the emergency call back indicator as a trigger to inform an access network to prepare and prioritize resources for the emergency call back. At event 210, the UE 14 examines the 'From Header' in the incoming SIP Invite and recognizes 'sos' as the standardized format indicating that the SIP Invite is from the PSAP 22 and is associated with an emergency call back. The UE 14 may then use this indication to put the call in the highest priority to assure a successful emergency call back. The UE 14 may take other actions as well, including dropping other ongoing calls, setting proper priority during the radio bearer setup procedure, and so on.

At event 212, the UE 14 forms a SIP 200OK message to respond to the SIP Invite. The UE 14 places the PSAP PUID in the 'To Header' and its own UE PUID in the 'From Header'. The SIP 200OK is then sent to the P-CSCF 16. As a note, according to the 3GPP2 specification, the P-CSCF 16 may not allow an emergency call initialization by means of a SIP Invite that has a PSAP PUID in the 'To Header'. However, the message sent at event 212 is not a SIP Invite initialization message, but instead may be a SIP 200OK. Therefore, as indicated at event 214, the P-CSCF 16 does allow the message that has the PSAP PUID in the 'To Header'. It should be noted that the P-CSCF 16 typically needs to be aware of and ready to receive the SIP 200OK or else it might reject the SIP 200OK. After the P-CSCF 16 has received the SIP Invite from the PSAP 22, the P-CSCF 16 can be made aware that the UE 14 might send the 200OK.

At events 216, 218, and 220, the P-CSCF 16 routes the SIP 200OK, via the S-CSCF 18 and the E-CSCF 20, to the PSAP 22. At event 222, the PSAP 22 forms a SIP ACK message to respond to the SIP 200OK. The PSAP 22 puts the UE PUID in the 'To Header' and its own PSAP PUID in the 'From Header' and sends the SIP ACK to the E-CSCF 20. At events 224, 226, and 228, the SIP ACK is then routed via the S-CSCF 18 and the P-CSCF 16 to the UE 14. At this point, the setup of the emergency call back is complete, as indicated at event 230. It should be appreciated that FIG. 2 is merely illustrative of one call flow for one embodiment of the present disclosure and that the present disclosure is not limited to only the illustrated call flow. Other call flows would occur for the numerous other embodiments disclosed herein.

Figure 3:
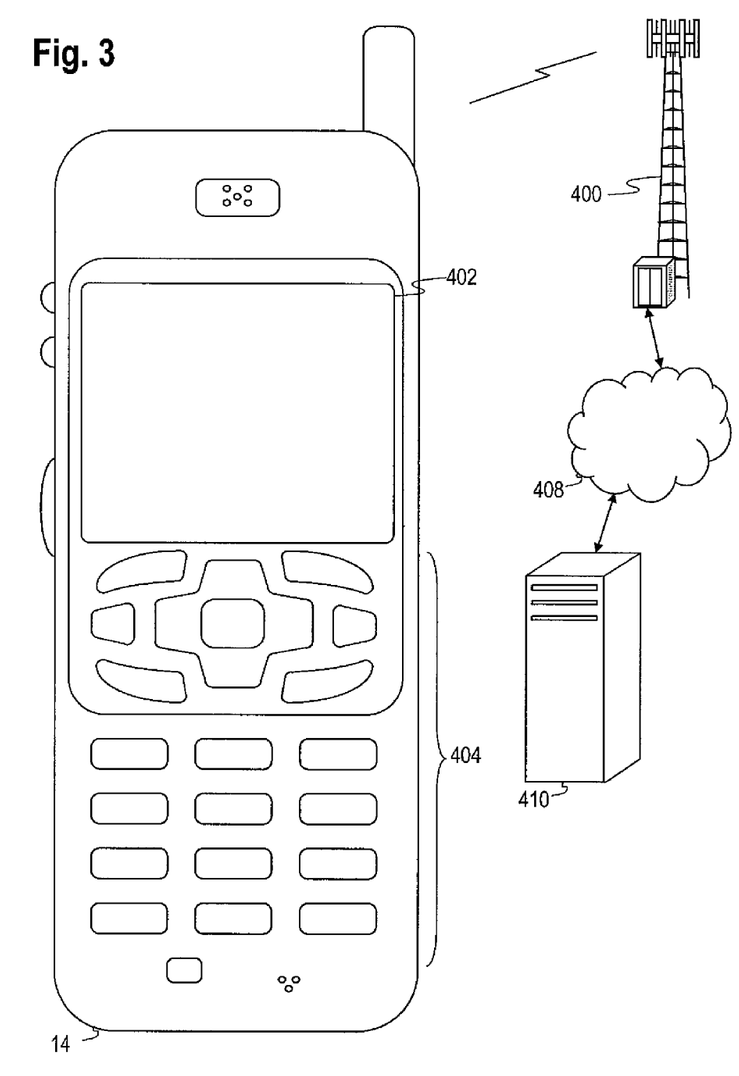
FIG. 3 is a diagram of a wireless communications system including user equipment operable for some of the various embodiments of the disclosure.

FIG. 3 illustrates a wireless communications system including an embodiment of the UE 14. The UE 14 is operable for implementing aspects of the disclosure, but the disclosure should not be limited to these implementations. Though illustrated as a mobile phone, the UE 14 may take various forms including a wireless handset, a pager, a personal digital assistant (PDA), a portable computer, a tablet computer, or a laptop computer. Many suitable devices combine some or all of these functions. In some embodiments of the disclosure, the UE 14 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 14 may be a portable, laptop or other computing device. The UE 14 may support specialized activities such as gaming, inventory control, job control, and/or task management functions, and so on.

The UE 14 includes a display 402. The UE 14 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 14 may present options for the user to select, controls for the user to actuate, and/or cursors or other indicators for the user to direct.

The UE 14 may further accept data entry from the user, including numbers to dial or various parameter values for configuring the operation of the UE 14. The UE 14 may further execute one or more software or firmware applications in response to user commands. These applications may configure the UE 14 to perform various customized functions in response to user interaction. Additionally, the UE 14 may be programmed and/or configured over-the-air, for example from a wireless base station, a wireless access point, or a peer UE 14.

Among the various applications executable by the UE 14 are a web browser, which enables the display 402 to show a web page. The web page may be obtained via wireless communications with a wireless network access node, a cell tower, a peer UE 14, or any other wireless communication network or system 400. The network 400 is coupled to a wired network 408, such as the Internet. Via the wireless link and the wired network, the UE 14 has access to information on various servers, such as a server 410. The server 410 may provide content that may be shown on the display 402. Alternately, the UE 14 may access the network 400 through a peer UE 14 acting as an intermediary, in a relay type or hop type of connection.

Figure 4:
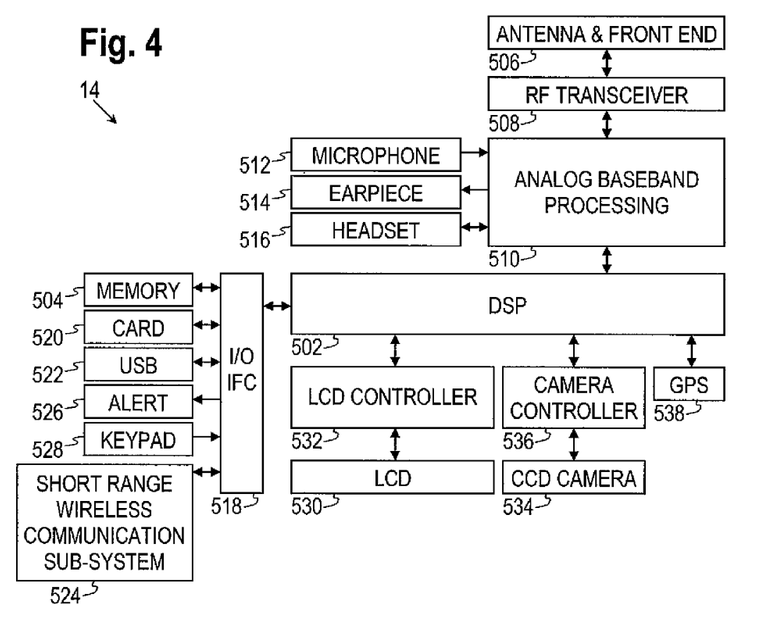
FIG. 4 is a block diagram of user equipment operable for some of the various embodiments of the disclosure.

FIG. 4 shows a block diagram of the UE 14. While a variety of known components of UEs 14 are depicted, in an embodiment a subset of the listed components and/or additional components not listed may be included in the UE 14. The UE 14 includes a digital signal processor (DSP) 502 and a memory 504. As shown, the UE 14 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 14 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 14 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 14 to send and receive information from a cellular network or some other available wireless communications network or from a peer UE 14. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 14 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 14 and may also enable the UE 14 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 14 to communicate wirelessly with other nearby mobile devices and/or wireless base stations.

The input/output interface 518 may further connect the DSP 502 to the alert 526 that, when triggered, causes the UE 14 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 14. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 14 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 14 to determine its position. Various other peripherals may also be included to provide additional functions, e.g., radio and television reception.

Figure 5:
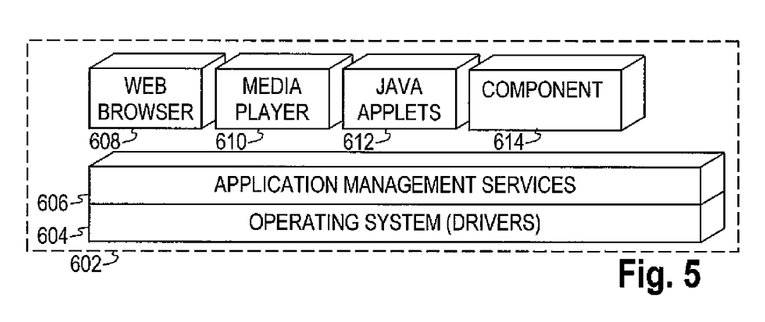
FIG. 5 is a diagram of a software environment that may be implemented on user equipment operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 14. Also shown in FIG. 5 are a web browser application 608, a media player application 610, and Java applets 612. The web browser application 608 configures the UE 14 to operate as a web browser, allowing a user to enter information into forms and select links to retrieve and view web pages. The media player application 610 configures the UE 14 to retrieve and play audio or audiovisual media. The Java applets 612 configure the UE 14 to provide games, utilities, and other functionality. A component 614 might provide functionality related to emergency calls.

Figure 6:
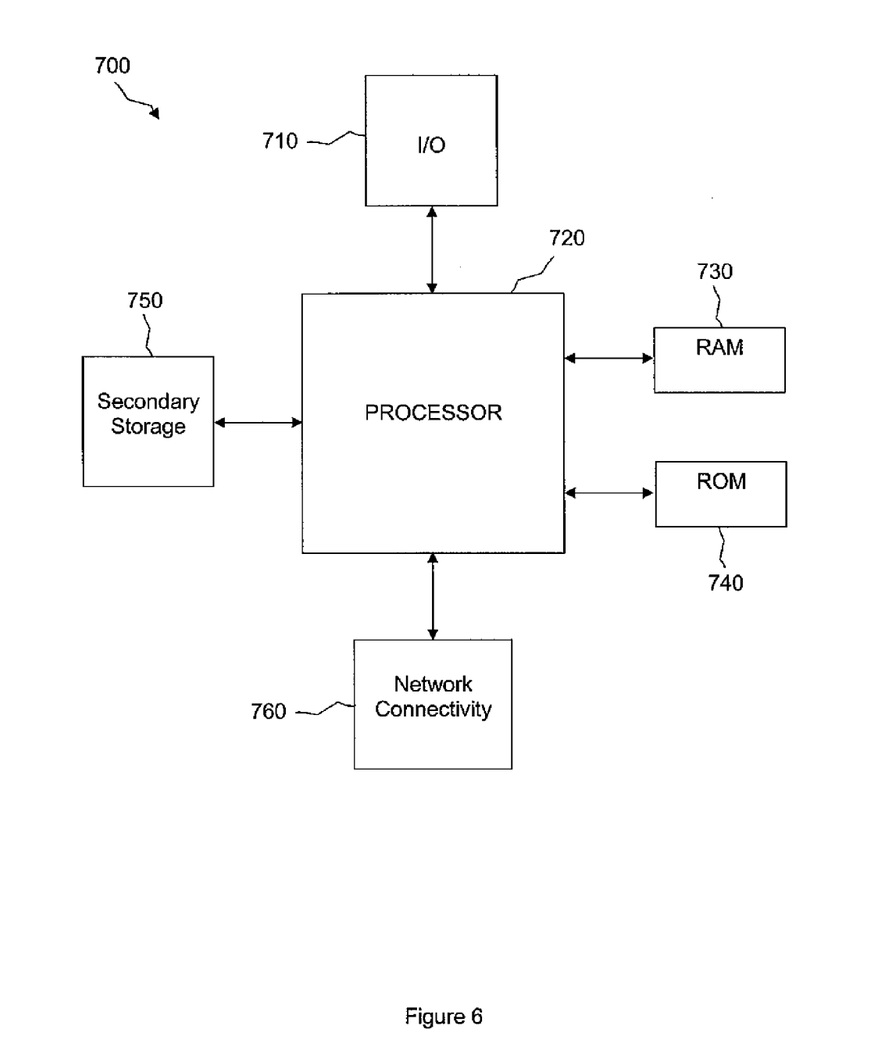
FIG. 6 is an illustrative general purpose computer system suitable for some of the various embodiments of the disclosure.

The UE 14, P-CSCF 16, S-CSCF 18, E-CSCF 20, and PSAP 22, as well as other components described herein, may be implemented in whole or part on, or may include, a general-purpose computer with sufficient processing power, memory resources, and network throughput capability to handle the necessary workload placed upon it. FIG. 6 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different events, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760. Although only one processor 720 is shown, multiple processors may be present. Instructions or processing discussed as accomplished by the processor may be simultaneously, serially, or otherwise a processed by one or more processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An apparatus, comprising:
a user equipment including a processor configured to recognize an Internet Protocol Multimedia Subsystem, IMS, call as an emergency call from a Public Safety Answering Point, PSAP, by an indication that is included in a Session Initiation Protocol, SIP, Invite message,
wherein the indication is a string of characters that identifies the PSAP as the source of the emergency call, and
wherein the indication is included in a P-Asserted-Identity Header of the SIP Invite message,
wherein the user equipment triggers an autonomous action when the user equipment does not receive an input in response to the emergency call within a predefined length of time after the user equipment receives the indication, and
wherein the autonomous action is at least one of:
sending an automated message to the PSAP;
sending a location of the user equipment to the PSAP; and
sending an automated message to an emergency-related entity other than the PSAP.

2. The apparatus of claim 1, wherein the SIP Invite message comes from the PSAP.

3. The apparatus of claim 1, wherein the processor is further configured to inspect all incoming SIP Invite messages for the indication.

4. A method for indicating an Internet Protocol Multimedia Subsystem, IMS, emergency call to a user equipment, comprising:
including in a Session Initiation Protocol, SIP, Invite message to the user equipment an indication that the emergency call is from a Public Safety Answering Point, PSAP,
wherein the indication is a string of characters that identifies to the user equipment the PSAP as the source of the emergency call, and
wherein the indication is included in a P-Asserted-Identity Header of the SIP Invite message,
wherein the indication triggers an autonomous action by the user equipment when the user equipment does not receive an input in response to the emergency call within a predefined length of time after the user equipment receives the indication,
wherein the autonomous action is at least one of:
sending an automated message to the PSAP;
sending a location of the user equipment to the PSAP; and
sending an automated message to an emergency-related entity other than the PSAP.

5. The method of claim 4, wherein the SIP Invite message comes from the PSAP.

6. The method of claim 4, wherein when the SIP Invite message is communicated to the user equipment via a Proxy Call Session Control Function, P-CSCF, the P-CSCF informs an access network to prepare and prioritize resources for the emergency call.

7. A system, comprising:
one or more processors; and
instructions that when executed by the one or more processors promote providing an indication in a SIP Invite message to a user equipment that an emergency call is from a Public Safety Answering Point, PSAP,
wherein the indication is a string of characters that identifies to the user equipment the PSAP as the source of the emergency call, and
wherein the indication is included in a P-Asserted-Identity Header of the SIP Invite message,
wherein the indication triggers an autonomous action by the user equipment when the user equipment does not receive an input in response to the emergency call within a predefined length of time after the user equipment receives the indication, and wherein the autonomous action is at least one of:
sending an automated message to the PSAP;
sending a location of the user equipment to the PSAP; and
sending an automated message to an emergency-related entity other than the PSAP.

* * * * *